United States Patent
Kim et al.

(10) Patent No.: US 11,905,851 B2
(45) Date of Patent: Feb. 20, 2024

(54) CMC TRAILING EDGE 3D WEAVED CROSS BRACE

(71) Applicant: Raytheon Technologies Corporation, Farmington, CT (US)

(72) Inventors: Russell Kim, Glastonbury, CT (US); James T. Roach, Vernon, CT (US); Jonas Banhos, West Hartford, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/126,556

(22) Filed: Mar. 27, 2023

(65) Prior Publication Data

US 2023/0313692 A1 Oct. 5, 2023

Related U.S. Application Data

(60) Provisional application No. 63/326,387, filed on Apr. 1, 2022.

(51) Int. Cl.
*F01D 5/28* (2006.01)
*F01D 5/14* (2006.01)

(52) U.S. Cl.
CPC ............. *F01D 5/282* (2013.01); *F01D 5/147* (2013.01); *F01D 5/284* (2013.01); *F05D 2230/31* (2013.01); *F05D 2240/122* (2013.01); *F05D 2250/75* (2013.01); *F05D 2300/2261* (2013.01); *F05D 2300/6012* (2013.01); *F05D 2300/6033* (2013.01); *F05D 2300/6034* (2013.01)

(58) Field of Classification Search
CPC .......... F01D 5/147; F01D 5/282; F01D 5/284; F05D 2240/122; F05D 2300/6033
See application file for complete search history.

(56) References Cited

U.S. PATENT DOCUMENTS

| | | | |
|---|---|---|---|
| 7,600,979 B2 | 10/2009 | Steibel et al. | |
| 8,038,408 B2 | 10/2011 | McMillan | |
| 10,767,494 B2* | 9/2020 | Hillier | F01D 25/12 |
| 2019/0145269 A1* | 5/2019 | Campbell | F01D 5/282 |
| | | | 416/223 R |

FOREIGN PATENT DOCUMENTS

| | | |
|---|---|---|
| EP | 4180633 A1 | 5/2023 |
| WO | 2020209847 A1 | 10/2020 |

OTHER PUBLICATIONS

Extended European Search Report for EP Application No. 23164847. 8, dated Aug. 3, 2023, 7 pages.

* cited by examiner

*Primary Examiner* — Brian O Peters
(74) *Attorney, Agent, or Firm* — Kinney & Lange, P.A.

(57) ABSTRACT

A method of forming a ceramic matrix composite airfoil includes forming a fibrous ceramic preform by laying up a plurality of plies to form a hollow core cavity, overwrapping the plurality of plies of the core cavity with a first overwrap layer, weaving together a tows of first free portion and tows of a second free portion of the first overwrap layer to form a cross brace, overwrapping the plurality of plies of the core cavity and the first overwrap layer with a second overwrap layer, and consolidating the first free portion and the second free portion of the first overwrap layer and a third free portion and a fourth free portion of the second overwrap layer to form a trailing edge.

17 Claims, 5 Drawing Sheets

CMC TRAILING EDGE 3D WEAVED CROSS BRACE

CROSS-REFERENCE TO RELATED APPLICATION(S)

This application claims the benefit of U.S. Provisional Application No. 63/326,387, filed Apr. 1, 2022 for "CMC TRAILING EDGE 3D WEAVED CROSS BRACE" by R. Kim, J. T. Roach, and J. Banhos.

BACKGROUND

The present invention relates to ceramic matrix composites, and more particularly to the reinforcement thereof.

In the manufacture of ceramic matrix composite (CMC) components, space filling inserts (e.g., "noodles") can be used to build upon and prevent large voids in the body of the CMC. Gas turbine engine airfoils commonly include such voids at their trailing edges. Such inserts can be difficult to form to neatly fill such cavities, and can sometimes become de-bonded from the surrounding walls of the airfoil. Alternative reinforcing techniques are therefore desirable.

SUMMARY

A method of forming a ceramic matrix composite airfoil includes forming a fibrous ceramic preform by laying up a plurality of plies to form a hollow core cavity, overwrapping the plurality of plies of the core cavity with a first overwrap layer, weaving together a tows of first free portion and tows of a second free portion of the first overwrap layer to form a cross brace, overwrapping the plurality of plies of the core cavity and the first overwrap layer with a second overwrap layer, and consolidating the first free portion and the second free portion of the first overwrap layer and a third free portion and a fourth free portion of the second overwrap layer to form a trailing edge.

A ceramic matrix composite airfoil includes a leading edge, a trailing edge opposite the leading edge, a pressure side extending from the leading edge to the trailing edge, a suction side opposite the pressure side and extending from the leading edge to the trailing edge, a hollow core cavity adjacent the leading edge and between the pressure side and the suction side, a trailing edge void between the leading edge and the trailing edge, and between the pressure side and the suction side, and a cross brace formed in the trailing edge void.

Figure 1:
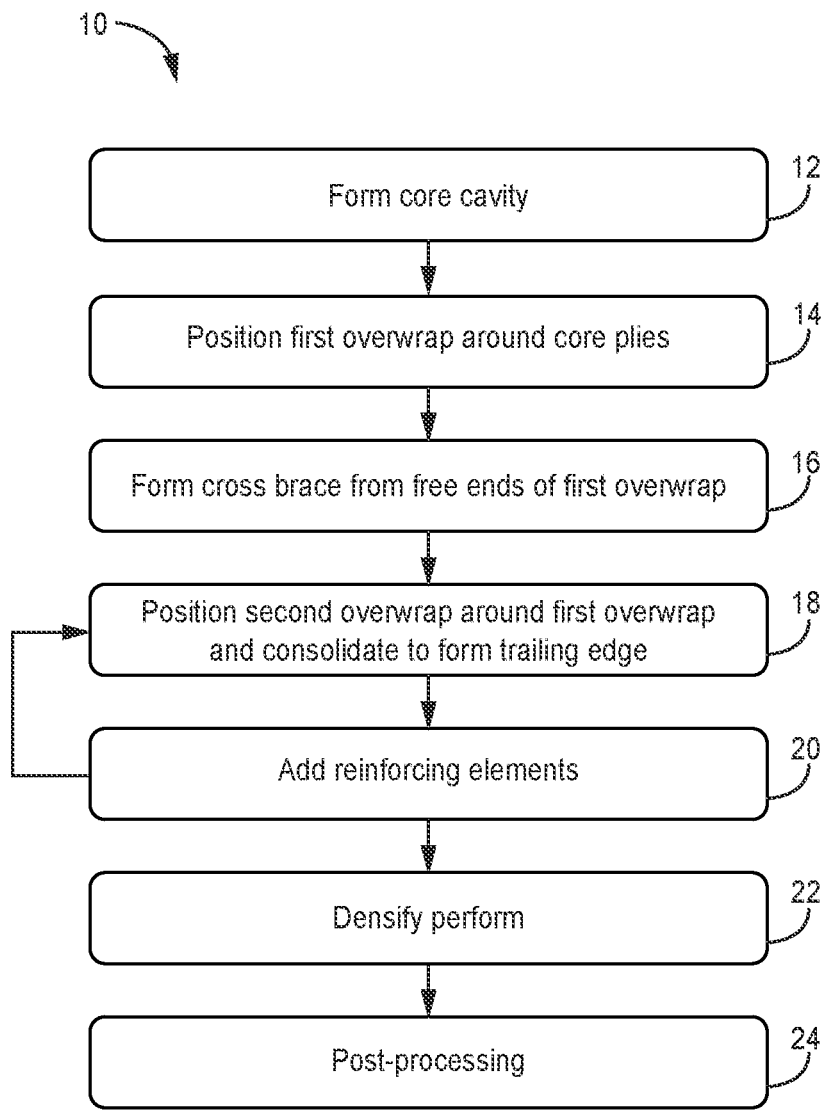
FIG. 1 is a flowchart illustrating a method of forming a CMC airfoil.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents a method of forming a CMC airfoil from a fibrous preform, A lay-up arrangement is provided which forms a void proximate the trailing edge. To stabilize the void, an inner overwrap is formed into a cross brace at the location of the void. The overwrap can be interwoven or stitched together at the site of the cross brace. Additional reinforcing elements can be included in the trailing edge cavity.

Figure 2:
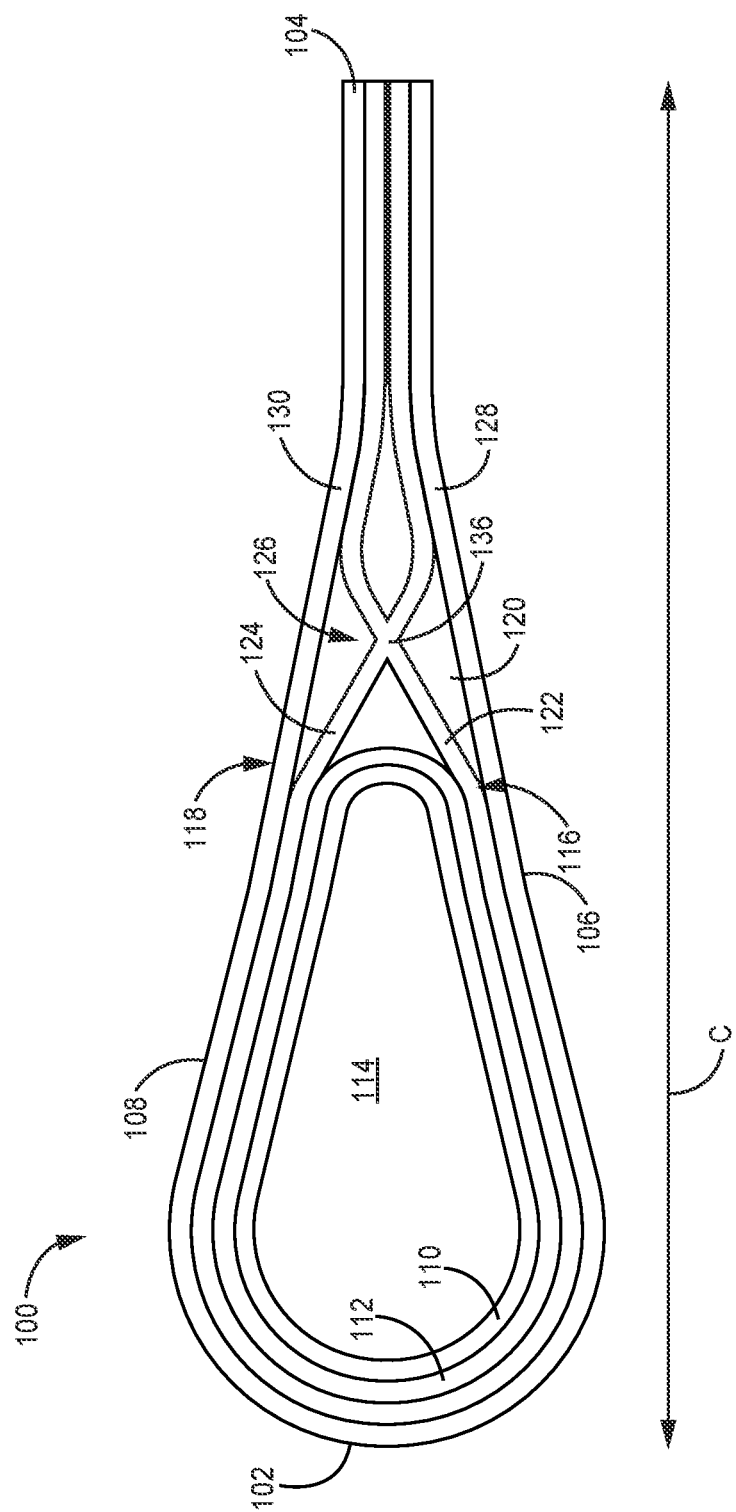
FIG. 2 is a cross-sectional view of a CMC airfoil with a cross brace in a trailing edge void.
Figure 3:
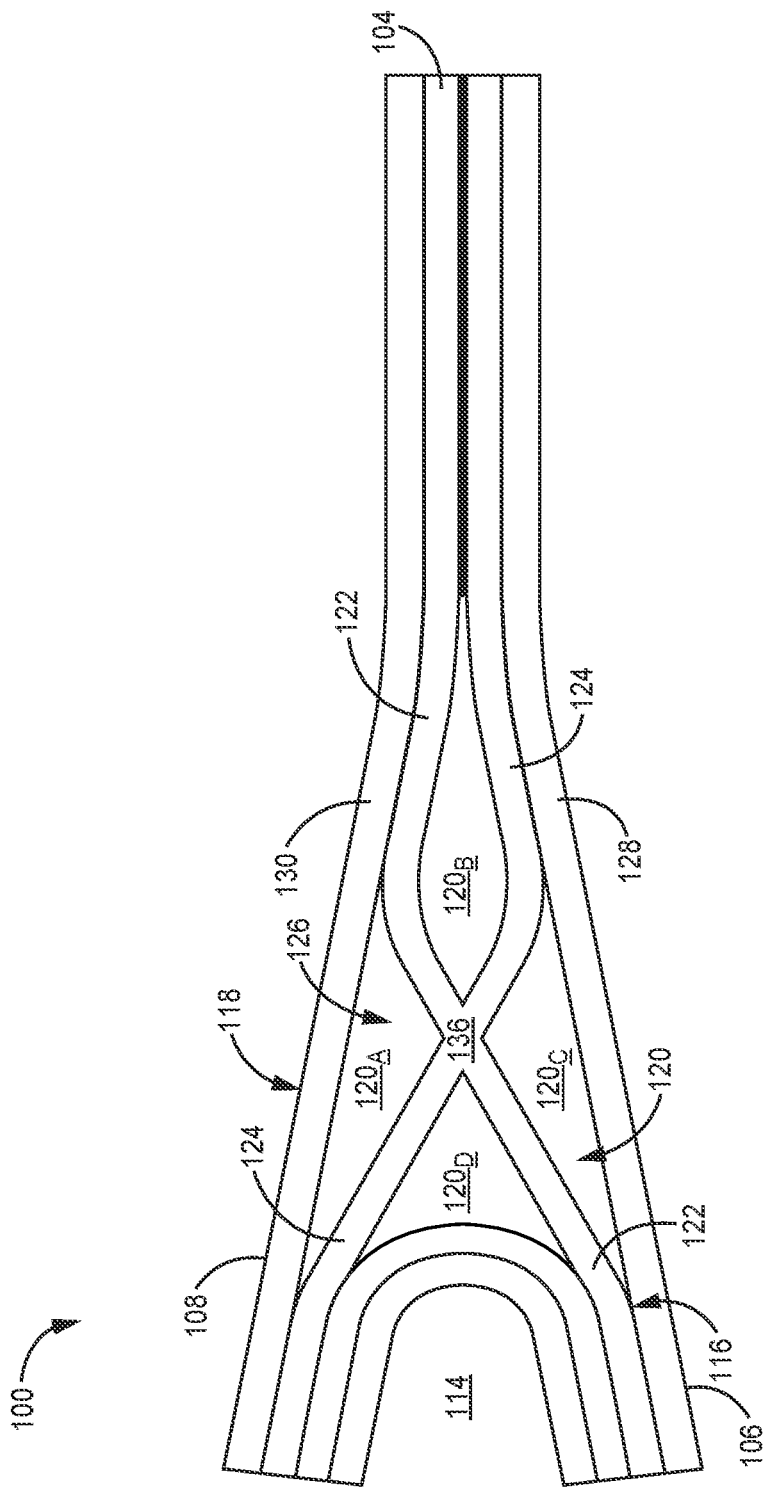
FIG. 3 is a close-up cross-sectional view of the trailing edge void and cross brace of FIG. 2.
Figure 4:
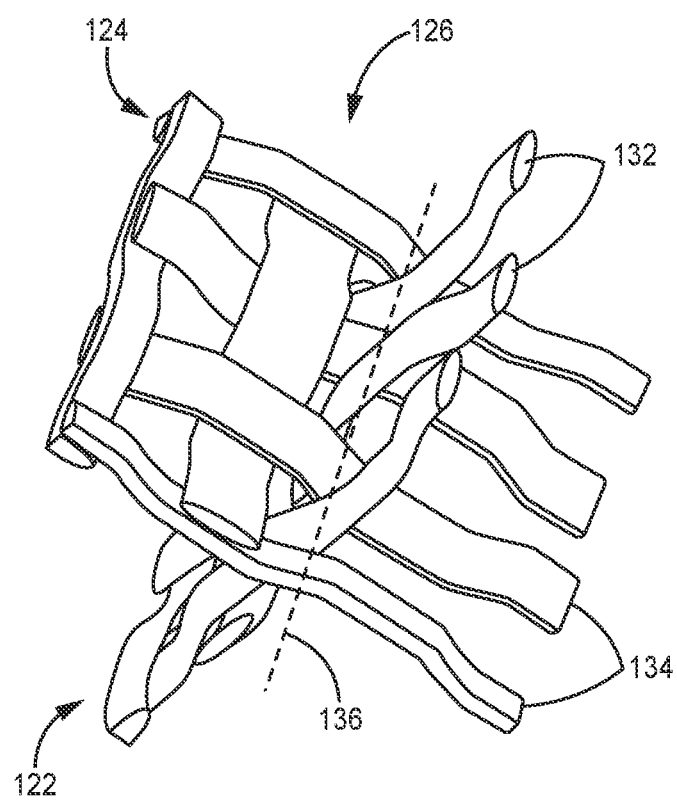
FIG. 4 is a close-up perspective view of the cross brace of FIGS. 2 and 3, in isolation, during formation.
Figure 5:
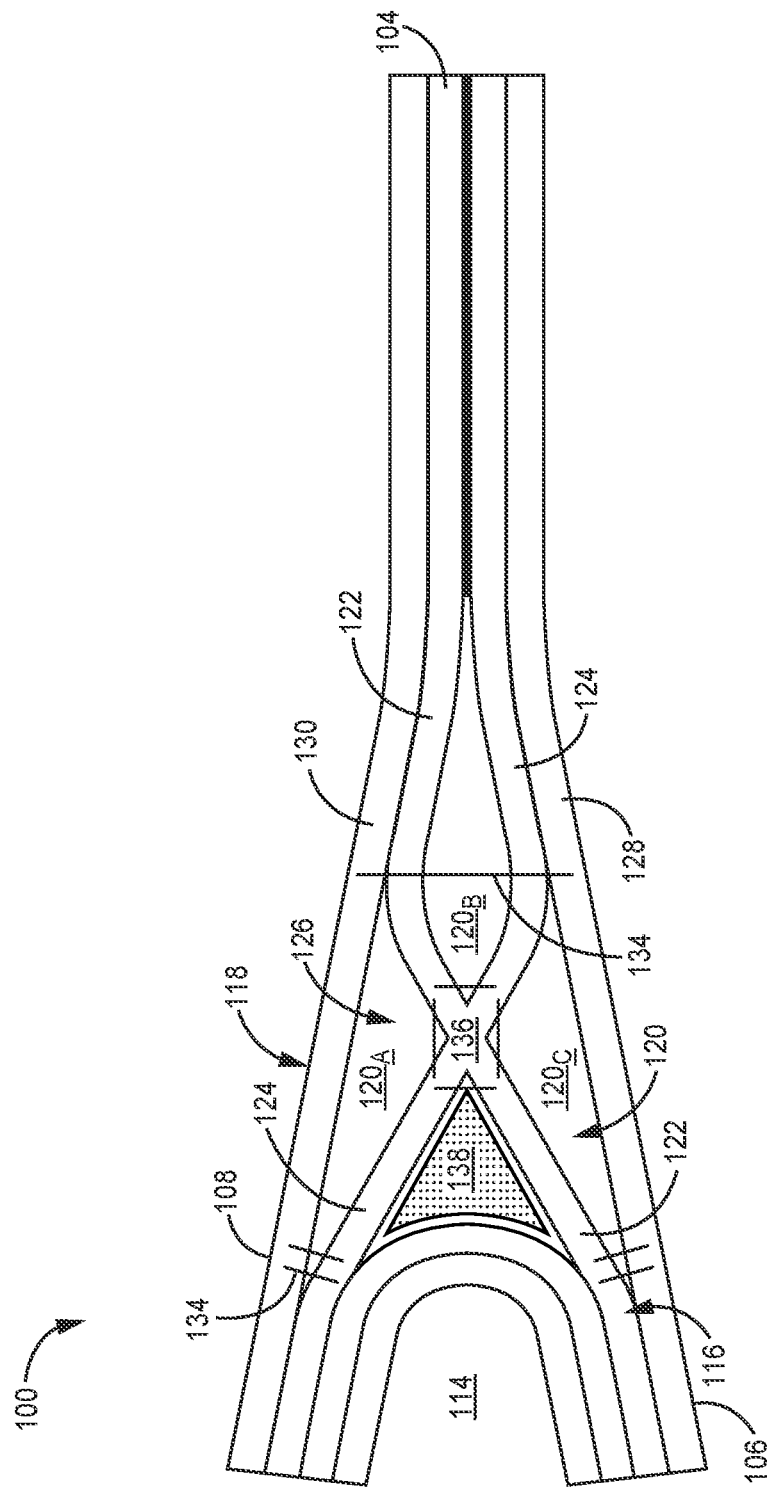
FIG. 5 is a close-up cross-sectional view of the trailing edge void and cross brace with additional reinforcing elements.

FIG. 1 is a flowchart illustrating method 10 of forming a CMC airfoil with a reinforced trailing edge void. FIG. 2 is a simplified cross-sectional view of airfoil 100 with a cross brace formed in the trailing edge void. FIG. 3 is a simplified close-up cross-sectional view of the trailing edge void and cross brace. FIG. 4 is a simplified perspective view of the cross-brace during formation. FIG. 5 is a simplified close-up cross-sectional view of the cross brace and additional reinforcing elements. Steps 12-24 of method 10 are described below in combination together with FIGS. 2-5.

As shown in FIG. 2, airfoil 100 includes leading edge 102 and oppositely disposed trailing edge 104. Each of pressure side 106 and oppositely disposed suction side 108 extends from leading edge 102 to trailing edge 104. Leading edge 102 and trailing edge 104 define a chord length, represented by line C, extending therebetween, A spanwise dimension (i.e., span) of airfoil 100 extends perpendicularly to line C (i.e., into/out of the page).

Airfoil 100 can be formed from fabrics (i.e., as plies, sheets, braids, etc.) of woven ceramic tows in an exemplary embodiment, Such fabrics can include perpendicular warp and weft tows arranged in various two-dimensional woven architectures such as plain, harness (e.g., 3, 5, 8, etc.), twill, and non-symmetric. Other woven architectures can include three-dimensional architectures such as braids (e.g., biaxial or triaxial) and interlock (e.g., orthogonal, layer-to-layer, angle, etc.) architectures. The ceramic material can be silicon carbide or another suitable ceramic material. Airfoil 100 can be, for example, part of a stationary vane or rotor blade in a gas turbine engine.

At step 12, core plies 110 and 112 can be laid up on a mandrel (not shown) in a concentric manner such that ply 110 is concentrically inward of core ply 112. When the mandrel is no longer in place, plies 110 and 112 define hollow core cavity 114, In the embodiment shown, core cavity 114 is located proximate leading edge 102. Core cavity 114 can be coextensive with the full span of airfoil 100. In an alternative embodiment, more than two plies can be used to form core cavity 114 depending, for example, on the type of airfoil and/or desired thickness of the walls surrounding core cavity 114.

At step 14, first (i.e., inner) overwrap 116 is placed around core plies 110 and 112. Overwrap 116 partially defines trailing edge 104 and trailing edge void 120 between core cavity 114 and trailing edge 104. In some embodiments, trailing edge void 120 can be coextensive with the full span of airfoil 100. First overwrap 116, extends around core plies 110 and 112 at leading edge 102, pressure side 106, and suction side 108.

At step 16, aft of core cavity 114, free pressure side portion/'end 122 and free suction side portion/end 124 of first overwrap 116 are brought together to form cross brace 126. As used herein, the term "cross brace" can apply to either structure as described in the first and second examples below, Because cross brace 126 is formed from overwrap 116, it can be coextensive with trailing edge void 120 and the full span of airfoil 100. Aft of cross brace 126, free pressure side portion 122 and free suction side portion 124 are brought together to partially form trailing edge 104. Second overwrap 118 is then placed around first overwrap 116 and core plies 110 and 112. In the embodiment shown, second overwrap 118 is the outermost fabric layer of the preform stage of airfoil 100. Free pressure side portion/end 128 and free suction side portion/end 130 of second overwrap 118 can be consolidated with portions 122 and 124 of first overwrap to form trailing edge 104. With cross brace 126 formed trailing edge void 120 is divided into four sub-cavities $120_A$, $120_B$, $120_C$, and $120_D$ (labeled in FIGS. 3 and 5), each coextensive with the full span of airfoil 100. Cross brace 126 has a generally "X" shaped cross-sectional geometry.

By way of a first example, cross brace 126 can be formed by weaving together free pressure side portion 122 and free suction side portion 124 of first overwrap 116. Such an execution of cross brace 126 is represented in FIGS. 3 and 4. In such a case, first overwrap 116 can be woven (two or three-dimensionally) over core plies 110 and 112, beginning, for example, at leading edge 102. With enough of free portions 122 and 124 formed aft of core cavity 114, tows 132 of free portion 122 can be woven through tows 134 of free portion 124. This creates intersecting point 136 (represented in FIG. 4 by a dashed line) aft/downstream of which the orientation of free portions 122 and 124 is reversed, such that free pressure side portion 122 is disposed on suction side 108 of airfoil 100 as it transitions into trailing edge 104, and similarly, free suction side portion 124 is disposed on pressure side 106 of airfoil 100. In some embodiments, the formation of cross brace 126 can involve a three-dimensional weaving technique to position one or more z-tows through free portions 122 and 124.

By way of a second example, cross brace 126 can be formed using localized stitching to join free portions 122 and 124 of first overwrap 116. In such a case, first overwrap 116 can be woven over core plies 110 and 112 as in the previous example, or first overwrap 116 can be separately woven into a cloth and laid up over core plies 110 and 112. Aft of core cavity 114, free pressure side portion 122 and free suction side portion 124 can be joined. (e.g., as two generally V-shaped segments pinched together, or as an H-shaped connection formed by Y-weaving) and stitched to form center point 136, returned to their respective pressure or suction sides 106, 108 to complete cross brace 126, and finally, brought together to partially form trailing edge 104. As such, free portions 122 and 124 do not intersect and switch sides as in the previous example, rather, each remains disposed on their respective sides of airfoil 100 extending into trailing edge 104. Such an execution of cross brace 126 is represented in FIG. 5.

At step 18, second overwrap 118 is placed around first overwrap 116 and core plies 110 and 112. Second overwrap 118 can be woven around overwrap 116 or can be separately woven and laid up around overwrap 116. In the embodiment shown, second overwrap 118 is the outermost fabric layer of the preform stage of airfoil 100, but in alternative embodiment, one or more additional overwraps can be used. Free pressure side portion 128 and free suction side portion 130 of second overwrap 118 can be consolidated with portions 122 and 124 of first overwrap 116 to form trailing edge 104. Consolidation methods can include a simple stacking arrangement that is densified in step 22, as well as the joining of the individual layers/plies into one with Y-weaving. With cross brace 126 formed and second overwrap 118 in place, trailing edge void 120 can be divided into four sub-cavities $120_A$, $120_B$, $120_C$, and $120_D$ (labeled in FIGS. 3 and 4, collectively referred to as "sub-cavities $120_A$-$120_D$").

At step 20, optional reinforcing elements can be added to trailing edge cavity 120. One such type of reinforcing element is reinforcing webbing 134, which can include targeted stitching with reinforcing z-tows, for example, between various combinations of free pressure side portions 122, 128 and free suction side portions 124, 130 of first and second overwraps 116 and 118, respectively. A second type of reinforcing element can include one or more fibrous inserts 138 placed in select sub-cavities $120_A$-$120_D$. Inserts 138 can be shaped to complement sub-cavity geometry and can be coextensive with the sub-cavity and full span of airfoil 100. It should be mentioned that although optional reinforcing elements are shown in FIG. 5 with the non-intersecting cross brace 126 of the second example, reinforcing elements can be used with either type of cross brace disclosed herein.

In some cases, all or portions of steps 18 and 20 may overlap, be reversed, and/or be repeated. For example, webbing 134 can be added after second overwrap 118 is position, but prior to the consolidation of trailing edge 104. Conversely, insert(s) 138 could be positioned after consolidation of trailing edge 104.

At step 22, the preform (i.e., layered arrangement of plies and overwraps) can undergo matrix formation and densification using a chemical vapor infiltration (CVI) process. During densification, the fibrous layers are infiltrated by reactant vapors, and a gaseous precursor deposits on the fibers. The matrix material can be a silicon carbide or other suitable ceramic material. Densification is carried out until the resulting CMC has reached the desired residual porosity. Typically, one or several interphases are deposited prior to the matrix to ensure that the composite fails in a non-brittle manner. Cross brace 126 has a reduced thickness and increased surface area compared to a conventional insert that would occupy the volume of trailing edge cavity 120, thus, the gaseous precursor can more evenly deposit on and within the various fiber structures within trailing edge cavity 120. The length of time required for satisfactory infiltration can, accordingly, be reduced. In an alternative embodiment, densification can additionally and/or alternatively include other methodologies such as, chemical vapor deposition (CVD), melt infiltration, and polymer infiltration and pyrolysis (PIP).

At step 24, various post-processing steps can be performed, such as the application of one or more protective coatings (e.g., environmental and/or thermal barrier coatings). A bond coat can also be applied to facilitate bonding between the CMC and a protective coating. Other protective coatings, especially those suitable for use in a gas turbine engine environment, are contemplated herein.

In operation of airfoil 100, trailing edge cavity 120 (i.e., as any of sub-cavities $120_A$-$120_D$) can receive a cooling airflow in the spanwise direction, With a conventional insert occupying nearly the entire volume of trailing edge cavity 120, such a cooling airflow could not be received. Thus, cross brace 126 can allow for improved thermal properties of airfoil 100, including reducing the thermal gradient and the temperature of trailing edge 104. Additionally, because cross brace 126 works as a truss structure, stress distribution at the trailing edge is improved over conventional designs. Finally, cross brace 126 is integral to the lay-up arrangement, and therefore will not come all or partially de-bonded from the surrounding structure during operation of the airfoil.

A CMC component formed with the disclosed stabilized ceramic fabric can be incorporated into aerospace, maritime, or industrial equipment, to name a few, non-limiting examples.

Discussion of Possible Embodiments

The following are non-exclusive descriptions of possible embodiments of the present invention.

A method of forming a ceramic matrix composite airfoil includes forming a fibrous ceramic preform by laying up a plurality of plies to form a hollow core cavity, overwrapping the plurality of plies of the core cavity with a first overwrap layer, weaving together a tows of first free portion and tows of a second free portion of the first overwrap layer to form a cross brace, overwrapping the plurality of plies of the core cavity and the first overwrap layer with a second overwrap layer, and consolidating the first free portion and the second free portion of the first overwrap layer and a third free portion and a fourth free portion of the second overwrap layer to form a trailing edge.

The method of the preceding paragraph can optionally include, additionally and/or alternatively, any one or more of the following features, configurations and/or additional components:

In the above method, overwrapping the plurality of plies of the core cavity with the first overwrap layer can include weaving a fabric layer around the plurality of plies.

In any of the above methods, forming the cross brace can include interweaving tows of the first free portion and tows of the second free portion.

In any of the above methods, overwrapping the plurality of plies of the core cavity with the first overwrap layer can include laying up a sheet over the plurality of plies of the core cavity.

In any of the above methods, forming the cross brace can include stitching together a first free portion and a second free portion of the cloth.

In any of the above methods, the cross brace can be disposed in a trailing edge void of the fibrous preform, and the cross brace can partially define a plurality of sub-cavities of the trailing edge void.

In any of the above methods, forming the fibrous ceramic preform can further include stitching a reinforcing fiber through the first overwrap layer and the second overwrap layer in the trailing edge void.

In any of the above methods, forming the fibrous ceramic preform can further include inserting a fibrous insert into one of the plurality of sub-cavities.

Any of the above methods can further include densifying the fibrous preform using at least one of chemical vapor infiltration, chemical vapor deposition, polymer infiltration and pyrolysis, and melt infiltration.

A ceramic matrix composite airfoil includes a leading edge, a trailing edge opposite the leading edge, a pressure side extending from the leading edge to the trailing edge, a suction side opposite the pressure side and extending from the leading edge to the trailing edge, a hollow core cavity adjacent the leading edge and between the pressure side and the suction side, a trailing edge void between the leading edge and the trailing edge, and between the pressure side and the suction side, and a cross brace formed in the trailing edge void.

The airfoil of the preceding paragraph can optionally include, additionally and/or alternatively, any one or more of the following features, configurations and/or additional components:

In the above airfoil, the cross brace can have an "X" shaped cross-sectional geometry.

In any of the above airfoils, a first free portion and an opposing second free portion of a ceramic overlap layer can form the cross brace and can partially form the trailing edge.

In any of the above airfoils, the cross brace can include a central intersecting point.

In any of the above airfoils, the first free portion can be disposed on the pressure side, and aft of the intersecting point, can be disposed on the suction side.

In any of the above airfoils, the cross brace can partially define a plurality of sub-cavities of the trailing edge cavity.

Any of the above airfoils can further include a fibrous insert disposed within one of the plurality of sub-cavities.

In any of the above airfoils, the cross brace can be coextensive with the trailing edge void and a span of the airfoil.

In any of the above airfoils, the airfoil can be formed from tows of silicon carbide and a matrix of silicon carbide.

In any of the above airfoils, the airfoil can be par of a stationary vane of a gas turbine engine.

In any of the above airfoils, the cross brace cane be formed from a first woven ceramic overlap layer, and the first ceramic overlap layer can be disposed between ceramic plies defining the core cavity, and a second, outer ceramic overlap layer.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of forming a ceramic matrix composite airfoil, the method comprising: forming a fibrous ceramic preform by: laying up a plurality of plies to form a hollow core cavity; overwrapping the plurality of plies of the core cavity with a first overwrap layer; weaving together a tows of first free portion and tows of a second free portion of the first overwrap layer to form a cross brace, the cross brace having an "X" shaped cross-sectional geometry; overwrapping the plurality of plies of the core cavity and the first overwrap layer with a second overwrap layer; and consolidating the first free portion and the second free portion of the first overwrap layer and a third free portion and a fourth free portion of the second overwrap layer to form a trailing edge, wherein the cross brace is disposed in a trailing edge void of the fibrous preform, partially defining a plurality of sub-cavities of the trailing edge void; and wherein the hollow core cavity and a first of the plurality of sub-cavities are separated from each other by a common wall comprised of a subset of the plurality of plies.

2. The method of claim 1, wherein overwrapping the plurality of plies of the core cavity with the first overwrap layer comprises: weaving a fabric layer around the plurality of plies.

3. The method of claim 2, wherein forming the cross brace comprises: interweaving tows of the first free portion and tows of the second free portion.

4. The method of claim 1, wherein overwrapping the plurality of plies of the core cavity with the first overwrap layer comprises: laying up a sheet over the plurality of plies of the core cavity.

5. The method of claim 4, wherein forming the cross brace comprises: stitching together a first free portion and a second free portion of the cloth.

6. The method of claim 1, wherein forming the fibrous ceramic preform further comprises: stitching a reinforcing fiber through the first overwrap layer and the second overwrap layer in the trailing edge void.

7. The method of claim 1, wherein forming the fibrous ceramic preform further comprises: inserting a fibrous insert into one of the plurality of sub-cavities.

8. The method of claim 1 and further comprising: densifying the fibrous preform using at least one of chemical vapor infiltration, chemical vapor deposition, polymer infiltration and pyrolysis, and melt infiltration.

9. A ceramic matrix composite airfoil comprising: a leading edge; a trailing edge opposite the leading edge; a pressure side extending from the leading edge to the trailing edge; a suction side opposite the pressure side and extending from the leading edge to the trailing edge; a hollow core cavity adjacent the leading edge and between the pressure side and the suction side; a trailing edge void between the leading edge and the trailing edge, and between the pressure side and the suction side; and a cross brace formed in the trailing edge void, the cross brace having an "X" shaped cross-sectional geometry, wherein the cross brace partially defines a plurality of sub-cavities; and wherein a shared wall separates a first of the plurality of sub-cavities from the hollow core cavity.

10. The airfoil of claim 9, wherein a first free portion and an opposing second free portion of a ceramic overlap layer forms the cross brace and partially forms the trailing edge.

11. The airfoil of claim 10, wherein the cross brace comprises a central intersecting point.

12. The airfoil of claim 11, where the first free portion is disposed on the pressure side, and aft of the intersecting point, is disposed on the suction side.

13. The airfoil of claim 9 and further comprising: a fibrous insert disposed within one of the plurality of sub-cavities.

14. The airfoil of claim 9, wherein the cross brace is coextensive with the trailing edge void and a span of the airfoil.

15. The airfoil of claim 9, wherein the airfoil is formed from tows of silicon carbide and a matrix of silicon carbide.

16. The airfoil of claim 9, wherein the airfoil is part of a stationary vane of a gas turbine engine.

17. The airfoil of claim 9, wherein the cross brace is formed from a first woven ceramic overlap layer, and wherein the first ceramic overlap layer is disposed between ceramic plies defining the core cavity, and a second, outer ceramic overlap layer.

* * * * *